United States Patent [19]
Patterson et al.

[11] Patent Number: 5,628,887
[45] Date of Patent: May 13, 1997

[54] ELECTROLYTIC SYSTEM AND CELL

[76] Inventors: James A. Patterson, 2074 20th St., Sarasota, Fla. 34234; Dennis Cravens, P.O. Box 1317, Cloudcroft, N.M. 88317-1317

[21] Appl. No.: 631,151

[22] Filed: Apr. 15, 1996

[51] Int. Cl.$^6$ .............................. C25B 9/00; C25B 15/08
[52] U.S. Cl. ................ 204/241; 204/242; 204/274; 204/284; 204/272
[58] Field of Search ........................ 204/228, 237, 204/241, 242, 284, 278, 274, 272

[56] References Cited

U.S. PATENT DOCUMENTS

| | | | |
|---|---|---|---|
| 917,176 | 4/1909 | Snelling | 204/242 X |
| 3,682,798 | 8/1972 | Tuddenham et al. | 204/285 X |
| 4,447,298 | 5/1984 | Betschler | 204/285 X |

*Primary Examiner*—Donald R. Valentine
*Attorney, Agent, or Firm*—Charles J. Prescott

[57] ABSTRACT

An electrolytic system and cell for excess heating of water containing a conductive salt in solution. The electrolytic cell includes a non-conductive housing defining a substantially closed interior volume and spaced apart first and second conductive members positioned within the housing. A plurality of conductive particles each having a conductive metal which is readily combinable with hydrogen or an isotope of hydrogen to form a metallic hydride are positioned within the housing in electrical contact with the first conductive member and electrically spaced from said second conductive member. The conductive particles may be of any convenient regular or irregular shape. An electric power source in the system is operably connected across the first and second conductive members whereby electrical current flows therebetween and through the conductive particles within the liquid electrolyte.

17 Claims, 6 Drawing Sheets

TYPICAL LOADING CURVE

1

ELECTROLYTIC SYSTEM AND CELL

BACKGROUND OF THE INVENTION

SCOPE OF INVENTION

This invention relates generally to electrolytic cells, and more particularly to an improved electrolytic cell and system for the electrolysis of a liquid electrolyte to produce excess heat.

PRIOR ART

The utilization of palladium coated microspheres or beads as a catalytic agent for the absorption of hydrogen is taught in prior U.S. Pat. Nos. 4,943,355 and 5,036,031. In these patents, the utilization of cross linked polymer microspheres forming an inner core and having a coating of palladium thereatop exhibit significant improvements in the level of hydrogen absorption and the absorption of isotopes of hydrogen.

Utilizing these catalytic microspheres led to the invention disclosed in U.S. Pat. Nos. 5,318,675 ('675) and 5,372,688 ('688) which teach an electrolytic cell, system and method for, inter alia, producing heat within a liquid electrolyte.

More recently, U.S. Pat. No. 5,494,559 discloses an improvement in the layer structure of the catalytic microspheres or beads within the electrolytic cell. The combination of nickel/palladium layers enhance the production of excess heat within the liquid electrolyte.

In each of these prior U.S. patents, the electrolytic cell described therein included an inlet and an outlet facilitating the continuous flow of the liquid electrolyte therethrough. Thus, as the liquid electrolyte is passed through the electrolytic cell, it is acted upon catalytically by the particular bed of catalytic particles contained within the housing of the electrolytic cell to keep the liquid electrolyte on a steady state basis producing excess heat for use.

The present invention eliminates the need for an inlet and an outlet of the housing so that the liquid electrolyte remains substantially within the interior volume defined by the substantially closed housing of the electrolytic cell. Various embodiments of separate heat exchange arrangements for conveying heat produced by the closed electrolytic cell are provided.

BRIEF SUMMARY OF THE INVENTION

This invention is directed to an electrolytic system and cell for producing excess heat within a liquid electrolyte containing a conductive salt in solution. The electrolytic cell includes a non-conductive housing defining a substantially closed interior volume and spaced apart first and second conductive members positioned within the housing. A plurality of conductive particles each having a conductive metal which is readily combinable with hydrogen or an isotope of hydrogen to form a metallic hydride are positioned within the housing in electrical contact with the first conductive member and electrically spaced from said second conductive member. The conductive particles may be of any convenient regular or irregular shape, uniform or varied in size. An electric power source in the system is operably connected across the first and second conductive members whereby electrical current flows therebetween and through the conductive particles within the liquid electrolyte during charging and operation of the system.

It is therefore an object of this invention to provide an improved electrolytic cell and system for producing excess heat.

It is yet another object of this invention to provide an improved electrolytic cell and system for the production of excess heat in a liquid electrolyte absent the need for an external flow arrangement for circulating the liquid electrolyte.

It is still another object of this invention to provide an electrolytic cell and system for producing excess heat in a liquid electrolyte wherein the excess heat is removed by an external heat exchange arrangement.

It is still another object of this invention to provide an electrolytic cell and system for producing excess heat which will operate at near the boiling point temperature of a liquid electrolyte.

In accordance with these and other objects which will become apparent hereinafter, the instant invention will now be described with reference to the accompanying drawings.

DETAILED DESCRIPTION OF THE INVENTION

Figure 1:
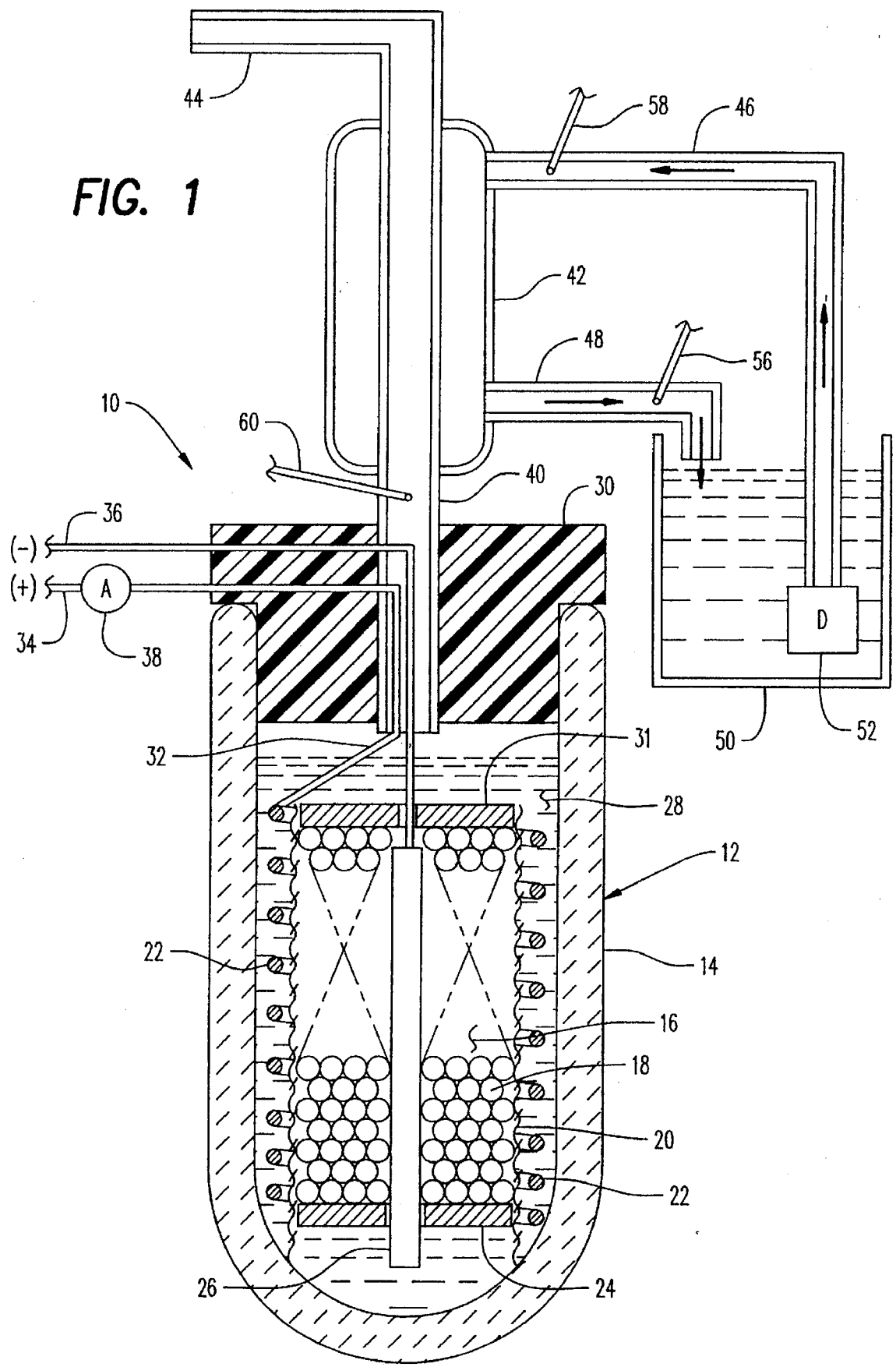
FIG. 1 is a side elevation section view of the preferred embodiment of an electrolytic cell and system.

Referring now to the drawings, and particularly to FIG. 1, the preferred embodiment of the electrolytic cell and system of the invention is there shown generally at numerals 12 and 10, respectively. The system 10 also includes an external heat transfer jacket 42 and a liquid cooling reservoir or tank 50. The electrolytic cell 12 includes a generally cylindrical closed bottomed glass non-conductive housing 14 such as a Dewar flask. Positioned within the housing 14 is a bed 16 formed of a plurality of conductive particles 18, each of which are formed of a conductive metal which is readily combinable with hydrogen or an isotope of hydrogen to form a metallic hydride or deuteride. The size and shape of these conductive particles 18 may be regular or irregular in both configuration and size, the exact make up of which is generally described in the five (5) patents referenced in the Background hereabove. However, the preferred metallic layering arrangement is atop a spherical styrene divinyl benzine bead and comprises a first layer of nickel, thickness of 2 to 6 µ (microns), a second layer of palladium, thickness of 1.4 µ and a third or outer layer of nickel, thickness of 0.6 µ. Nominal diameter is 0.9 mm. These layers are applied by electroless plating or by sputtering techniques.

The bed 16 of conductive particles 18 is held in a generally cylindrical configuration by a cylindrically shaped non-metallic nylon mesh screen 20, 500 µm pore size, and upper and lower non-conductive plates 31 and 24, respectively made of polycarbonate material. Surrounding the nylon mesh screen 20 is a conductive spiral wound coil 22 which serves as an anode by interconnection with conductor 32 to a positive (+) voltage source at 34. An ammeter 38 measures current flow therethrough.

A slender conductive rod 26 made of nickel, titanium, or platinum (nickel preferred) extends centrally through the length of the bed 16 and serves as a cathode by interconnection with conductor 36 to the negative (−) side of a voltage source which produces a constant, controlled current output. A stopper 30 substantially seals the interior volume of the non-conductive housing 14 except with respect to a vent tube 40 passing from the interior volume upwardly through stopper 30 as shown. A heat transfer jacket 42 surrounds an external portion of vent tube 40 so that liquid such as water contained in a separate supply tank 50 may be pumped by pump 52 through conduit 46 into the heat transfer jacket 42 and then returned through conduit 48 back to the supply tank 50, the net result being a heating of the liquid in the supply tank 50.

In operation, the electrolytic cell 12 is filled with a liquid electrolyte 28 described herebelow in an amount sufficient to immerse the particle bed 16 and the surrounding anode 22 and cathode 26. The electrolytic cell 12 is then charged as described herebelow by the appropriate application of electrical current between the anode 22 and the cathode 26. Thereafter, a steady preselected level of electrical current is passed between the anode 22 and the cathode 26 to heat the liquid electrolyte 28 by catalytic interaction between the liquid electrolyte 28 and the particles 18. When the liquid electrolyte 28 reaches its boiling temperature, a phase change to steam occurs first, after which the electric current liberates hydrogen and oxygen contained within the electrolyte which includes water in steam form. This hot steam rises into the condensing tube 40 and is cooled by the water circulating within heat exchange jacket 42. Thereafter, hydrogen and oxygen are vented while the steam recombines into a liquid and is downwardly conveyed by gravity back into the electrolytic cell 12. Extension tube 44 helps to minimize or prevent excess gases from venting to atmosphere or otherwise escaping.

By this arrangement, the electrolytic cell 12 may operate at a temperature substantially at the boiling temperature of the liquid electrolyte without pressurization, that electrolyte operating temperature being monitored at thermocouple 60. The net operating efficiency of this system 10 is monitored by thermocouples 56 and 58 which measure the temperature differential of the water circulating through heat exchange member 42. Performance data is shown in Table I herebelow.

Figure 2:
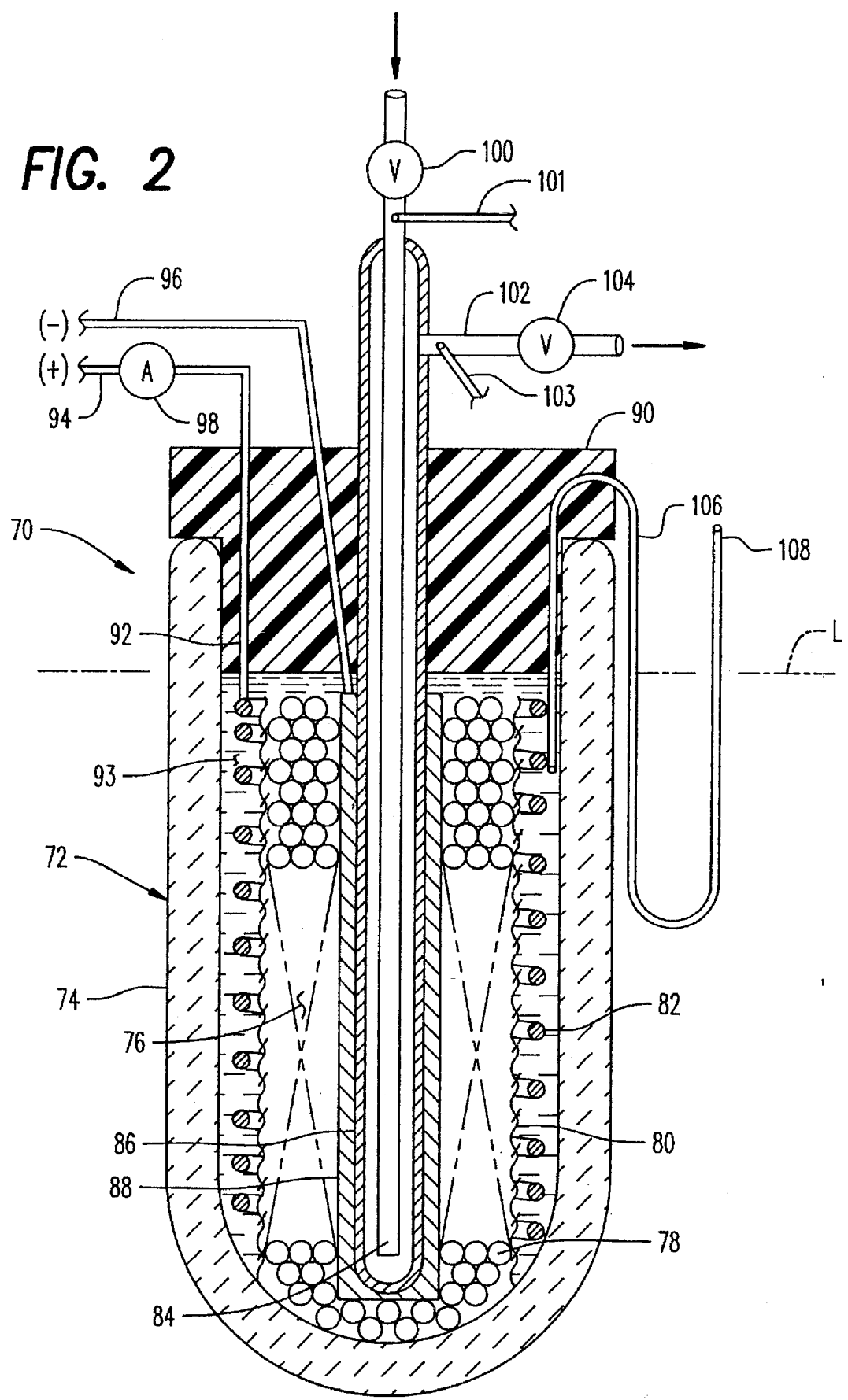
FIG. 2 is a side elevation section view of another embodiment of an electrolytic cell and system.

Referring now to FIG. 2, another embodiment of the invention is shown generally at numeral 70 and includes an electrolytic cell 72 having a non-conductive glass housing 74 also formed of a Dewar flask which, in combination with stopper 90, forms a substantially closed interior volume. Centrally within the interior volume is a generally cylindrically shaped bed 76 of conductive particles 78, the general characteristic of which is that each of the particles 78 include a conductive metal which is readily combinable with hydrogen or an isotope of hydrogen to form a metallic hydride or deuteride. The general details of the various embodiments of these conductive particles 78 are as described hereinabove with respect to particles 18 in FIG. 1.

The bed 76 has its outer cylindrical shape defined and maintained by a cylindrical nonconductive cylindrical nylon mesh or screen 80, 500 μm pore size, which is surrounded by a conductive coil 82. The conductive coil 82 is interconnected by conductor 92 to a positive (+) voltage source to thus serve as a cathode. Current flow to the outer conductive coil member 82 is measured by ammeter 98.

An elongated cylindrical conductor 88 made of nickel, titanium or platinum (nickel preferred) defines the inner surface of and is in electrical contact with the particle bed 76 and is interconnected by conductor 96 to the negative (−) voltage source to thus serve as a cathode. The cathode conductive member 88 has an interior longitudinal cavity closed at a lower end thereof which houses a heat exchange member 86 and a centrally positioned slender liquid flow tube 84. The heat exchange member 86 has an outlet at 102 so that, when valves 100 and 104 are opened, liquid, preferably water, flows into conduit 84 in the direction of the arrow and discharges out through conduit 102 after flowing through the heat exchange member 86.

After the electrolytic cell 72 is properly filled with the liquid electrolyte to level L and the liquid electrolyte 76 and the electrolytic cell 72 have been properly initialized or charged as described herebelow, a preselected current level between the conductive members 82 and 88, passing through particle bed 76 and the electrolyte 93, triggers a reaction between the liquid electrolyte and the conductive particles 78 to produce heat within the electrolyte 93 which is conveyed by heat exchange member 86 into the water passing into valve 100 and exiting through valve 104. By monitoring the temperature differential of the water at thermocouples 101 and 103, the overall efficiency of this system 10 is determined and monitored. Syphon 106, being connected to an external supply of a liquid electrolyte at 108, maintains the liquid electrolyte at the desired level L. Actual performance results are presented in Table II herebelow.

Figure 3:
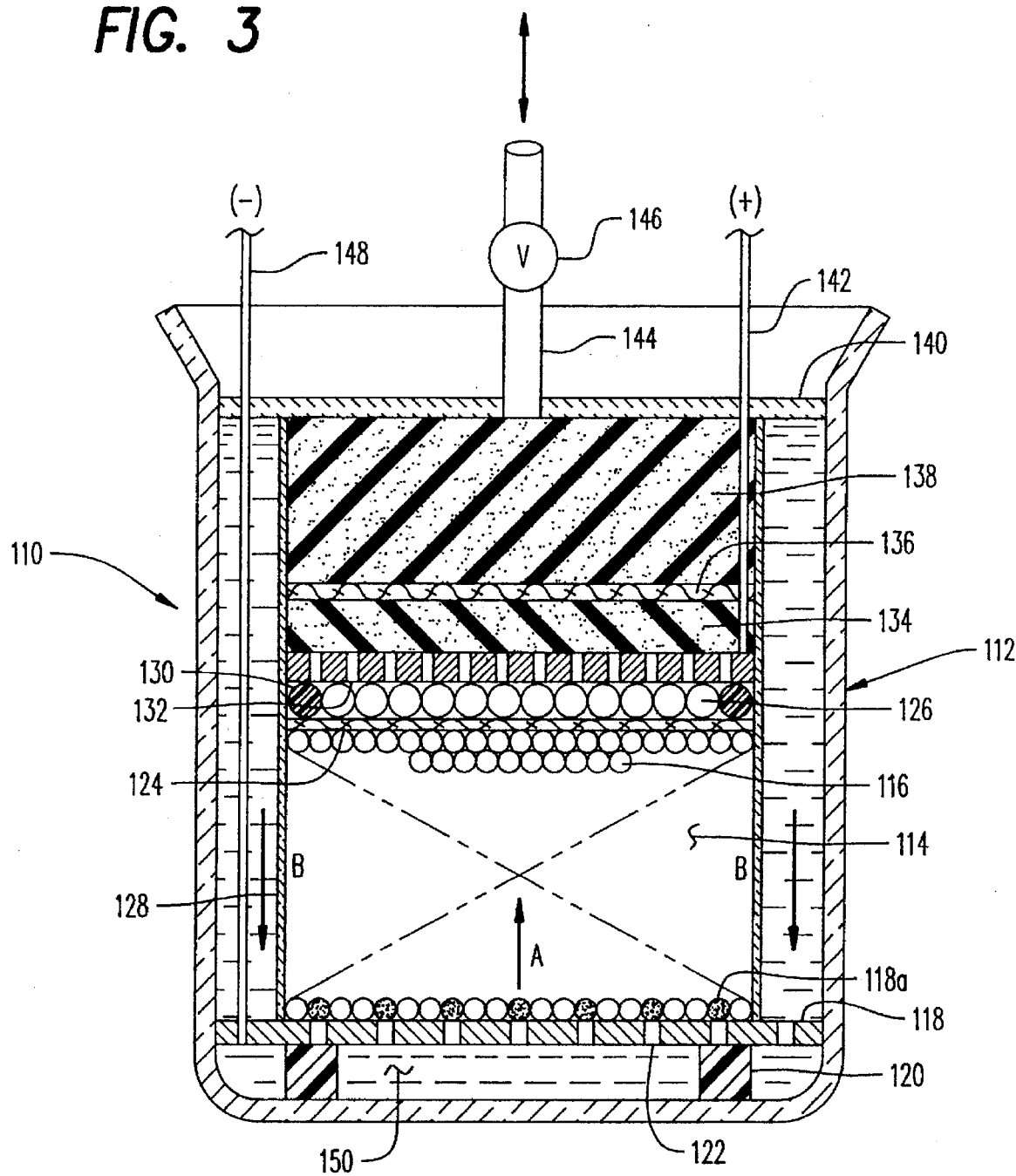
FIG. 3 is a side elevation section view of still another embodiment of an electrolytic cell and system.

Referring now to FIG. 3, another embodiment of the invention is there shown at numeral 110 which includes a non-conductive glass housing or beaker 12 substantially closed at an upper end thereof by non-conductive plate 140. A cylindrically shaped bed 114 of conductive particles 116, each of which include a conductive metal which is readily combinable with hydrogen or an isotope of hydrogen to form a metallic hydride or deuteride, is supported atop a perforated conductive grid 118. The composition of the conductive particles 16 in this embodiment is as described hereinabove with respect to particles 18 in FIG. 1.

The conductive grid 118, itself supported on non-conductive circular spacer 120, includes spaced holes 122 sized so that one of the conductive particles 118a in the shape of a spherical bead sits atop and seals the upper end thereof to serve as check valves for each of the perforations or holes 122 to maintain electrolyte flow in the direction of arrow A. A cylindrical, hollow nylon screen 128 having a mesh size of 500 μm defines the outer cylindrical surface of the particle bed 114 and extends between the conductive perforated plate 118 and the closure plate 140.

The upper surface of the particle bed 114 is defined and held by a nylon nonconductive screen 124 having a bore or mesh size of 500 μm. Positioned above the nylon screen 124 is a layer of non-metallic beads 126 each having ionic exchange properties to form a conductive salt bridge thereacross in the presence of a liquid electrolyte 150. Positioned immediately above the non-metallic sulfonated beads 126 is a conductive perforated plate 132 which is connected by conductor 142 to a positive voltage source so that the perforated conductive plate 132 serves as an anode which may be formed of either titanium or platinum. O-ring 130 prevents beads 126 and particles 116 from moving around the periphery of conductive screen 124.

A liquid electrolyte reservoir is provided above the conductive perforated grid 132 in the form of a first nylon sponge 134 and a second nylon sponge 138 spaced apart by a platinum screen recombinator 136.

The cathode perforated grid 118 is electrically connected by conductor 148 to the negative (−) voltage source so that the particle bed 114 is in electrical communication with the negative (−) voltage supply.

With the electrolytic cell 112 filed with a liquid electrolyte 150 described herebelow, and the d.c. current applied between conductors 142 and 148, the catalytic action of the particle bed 114 in the presence of the liquid electrolyte 150 electrolyzes the water in the liquid electrolyte and produces excess heat. The liquid electrolyte 150 thus circulates within the cell 112 by flowing upwardly in the direction of the arrow A through the holes 122 and then downwardly in the direction of arrows B. Particles 124 are sized to close perforations 112 to prevent back flow of electrolyte liquid. Excess heat produced without the cell 112 may be removed for use by, for example, a Peltier heat transfer device.

Vent tube 144, connected into the interior volume of electrolytic cell 112 through sealed pressure plate 140, serves to initially vent the hydrogen and oxygen gas produced by the electrolysis action of the particle bed 114 to return and steam condensed back into a liquid by cooling as by a heat exchanger as shown in FIG. 1, thus allowing the recondensed liquid to return back into the interior volume of the electrolytic cell 112.

As the hydrogen and oxygen rise from the particle bed 114 during heating of the liquid electrolyte, the platinum screen recombinator 136 serves to partially effect recombination of the hydrogen and oxygen gas back into a liquid to minimize gas exiting through condensing tube 144. Valve 146 serves to regulate the upward gas flow, downward recombined electrolyte flow, and pressure within the electrolytic cell 112. This cell 112 was not test run as it is expected to perform in keeping with the other cells whose test performance is described herein.

Figure 4:
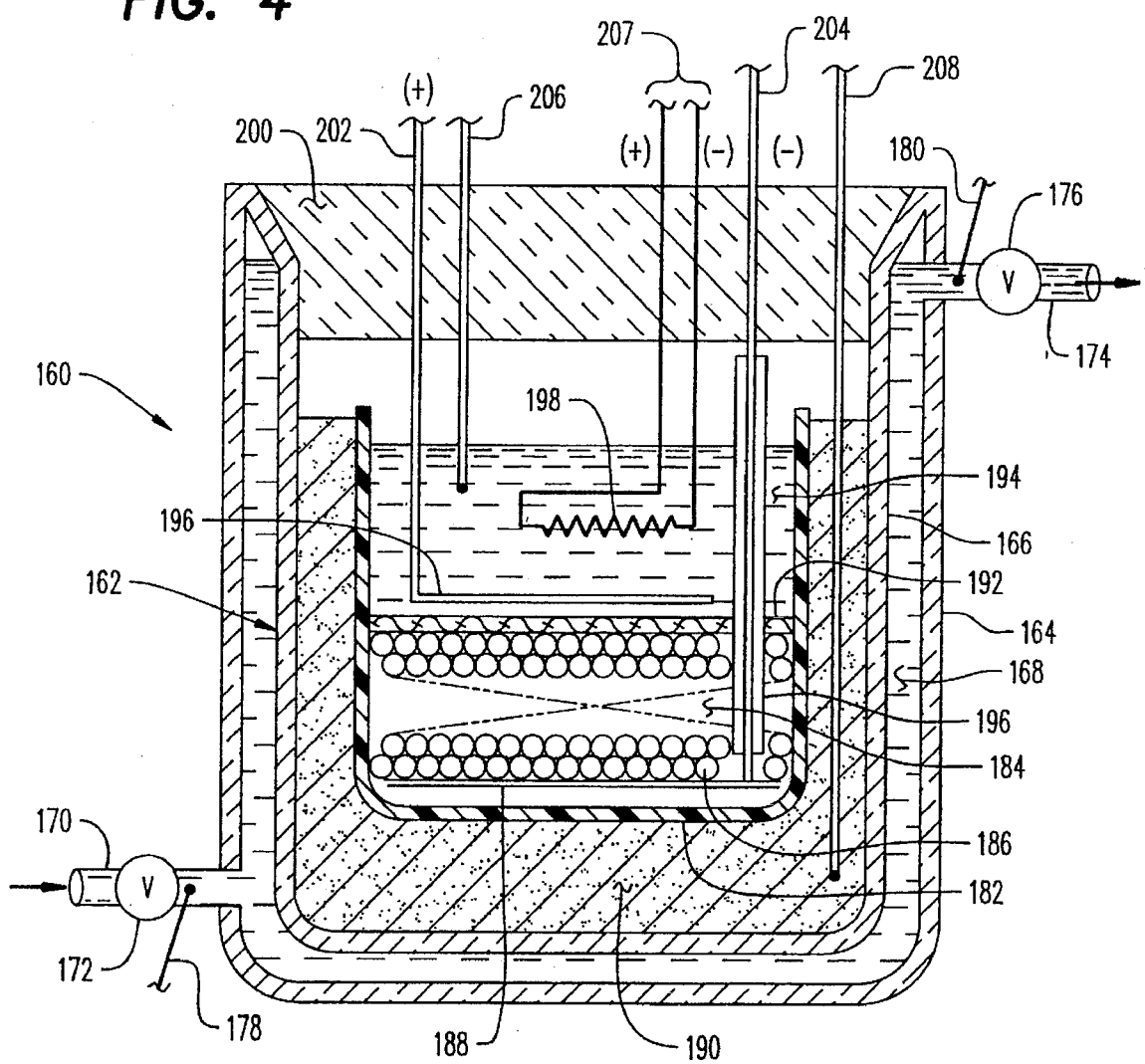
FIG. 4 is a side elevation section view of yet another embodiment of an electrolytic cell and system.

Referring to FIG. 4, yet another embodiment of the invention is there shown as a system at numeral 160 and includes an electrolytic cell 162 surrounded as shown by a cooling jacket 164. The electrolytic cell 162 includes a glass, non-conductive beaker or housing 166 having an insulated stopper 200 positioned at its open upper end to form a substantially closed and sealed interior volume of the electrolytic cell 162. An inner nonconductive plastic cup 182 is positioned centrally within the non-conductive housing 166, the two members spaced apart by a layer of fill sand 190. A bed 184 of conductive particles 186, each of which includes a conductive metal which is readily combinable with hydrogen or an isotope of hydrogen to form a metallic hydride or deuteride, is positioned within the non-conductive cup 182. The conductive particles 186 are generally as described hereinabove with respect to particles 18 in FIG. 1.

The bed 184 is supported by a conductive cathode member 188 at a lower surface thereof and defined and held at an upper surface thereof by a nylon non-conductive perforated or foraminous grid 192, mesh size 500 μm. A conductive anode member or electrical contact 196 is connected by conduit 202 to a positive (+) voltage source, while the conductive cathode contact or plate 188 is connected by conductor 104 to a negative (−) voltage source. Conductor 204 extends in insulated fashion within an insulated TEFLON tube 196.

The cup 182 is filled with a liquid electrolyte 194 as described herebelow so as to completely submerge the particle bed 184 and conductive members 188 and 196. Submerged within the liquid electrolyte 194 is a resistive heating element 198 which is operably connected to a suitable voltage source at 206 so as to enable independently raising or elevating the temperature of the liquid electrolyte 194 to enhance charging and operation of the particle bed 184. Temperature of the liquid electrolyte is measured by thermocouple 206. Test results are shown in Table III herebelow.

The heat exchange jacket 164 is in the form of an outer container which sealedly surrounds the non-conductive container 166. Liquid coolant or heat exchange liquid 168 such as water enters through conduit 170 as regulated by valve 172 into cavity formed between the non-conductive housing 166 and the heat exchange jacket 164. The heat exchange liquid 168 then exists through valve 176 at 174. Temperature differential or rise of the heat exchange liquid 168 as it flows through heat exchange jacket 164 is monitored by thermocouples 178 and 180.

Figure 5:
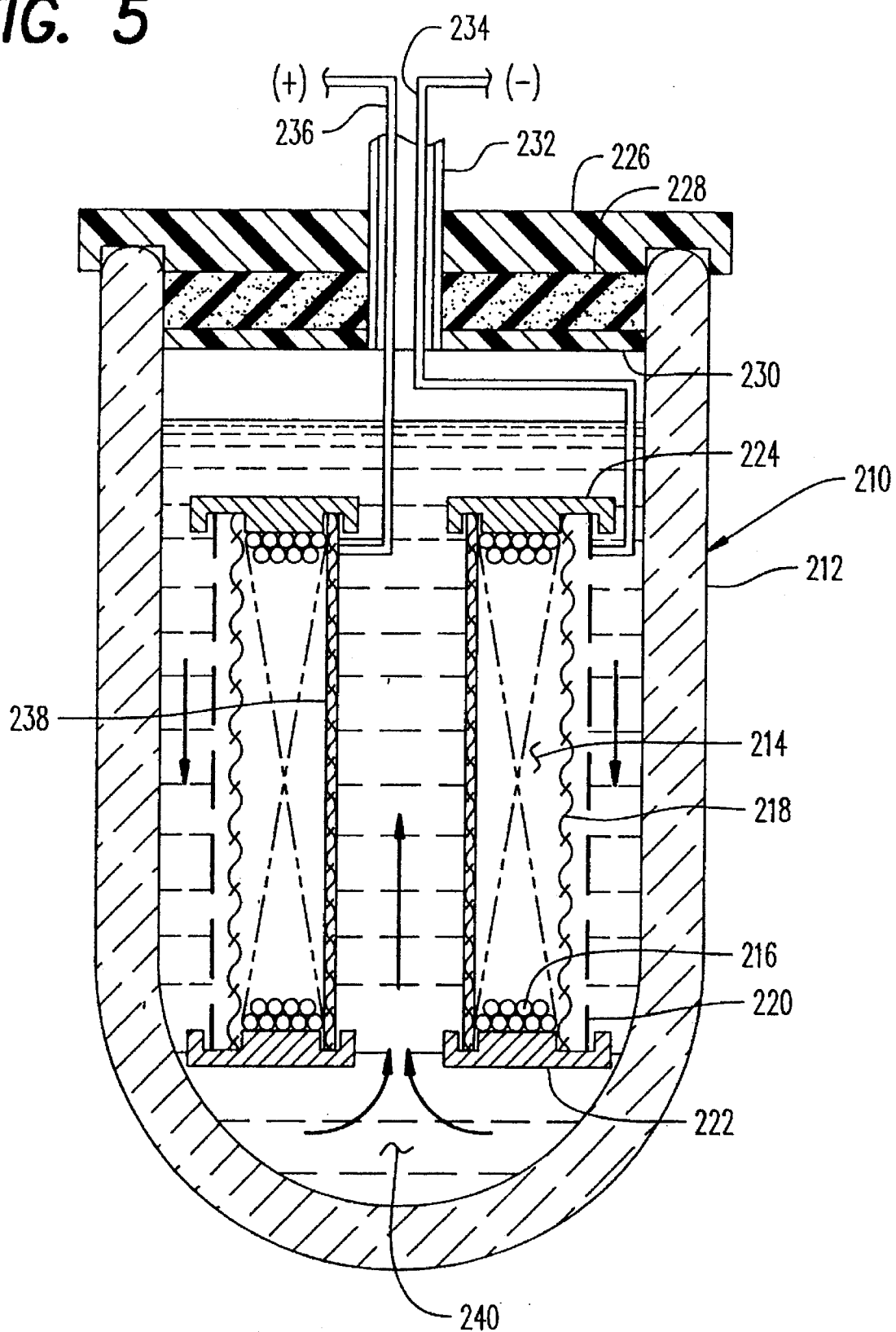
FIG. 5 is a side elevation section view of an alternate embodiment of the electrolytic cell of FIG. 1.

Referring now to FIG. 5, an alternate embodiment of the invention similar to that above described with respect to FIG. 1 is there shown generally at numeral 210. This electrolytic cell embodiment 210 is part of the system 10 described in FIG. 1, as alternate to cell 12, which includes a heat transfer jacket 42 operably interconnected to the liquid coolant supply tank or reservoir 50 described in FIG. 1 and not shown in FIG. 5.

The electrolytic cell 210 includes a generally cylindrical closed bottom glass nonconductive housing 212 such as a Dewar flask. Positioned within the non-conductive housing 212 is a bed 214 formed of a plurality of closely packed conductive particles 216, each of which is formed of a conductive metal which is readily combinable with hydrogen or an isotope of hydrogen to form a metallic hydride or deuteride. The size and shape of these conductive particles 216 may be regular or irregular in both configuration and size, the general makeup of which is described with respect to particles 18 in FIG. 1.

The bed 214 of conductive particles 216 is held in a generally cylindrical configuration by a cylindrically shaped outer non-metallic nylon mesh screen 218 having a mesh size of 500 μm, upper and lower non-conductive plates 224 and 222, respectively, formed of polycarbonate material, and a centrally located cylindrical hollow conductive screen cathode 238, 40 mesh size, all of which are generally coextensive one to another. Surrounding the nylon mesh screen 218 is a conductive cylindrical metallic perforated anode 220 which is interconnected by conductor 234 to a negative (−) side of a voltage source. Cathode 238 is likewise connected by conductor 236 to a positive (+) side of the voltage source. An ammeter as at 38 in FIG. 1 measures current flow across the bed 214. The cylindrical hollow cathode 238 is preferably made of nickel, titanium or platinum screen, (platinum, mesh size 40, preferred) while the cylindrical conductive hollow perforated anode 220 is preferably of the same makeup and mesh.

The upper end of housing 212 is substantially sealed to define an interior volume by spaced polycarbonate plates 226 and 230, held spaced apart by a foam insulation layer 228. The interior volume of the electrolytic cell 210 is vented by vent tube 232 into the heat exchange jacket 42 of FIG. 1 and operates in a similar fashion as hereinabove described.

This electrolytic cell 210 provides more efficient circulation of the liquid electrolyte 240 upwardly in the direction of the arrows through the cylindrical cathode 238 and then returning downwardly around the outside of the cylindrical outer anode 220, the bed 214 of conductive particles 216 being fully immersed in the flowing liquid electrolyte 240 as in all embodiments of this invention.

It should be understood that excess heat produced by all of these embodiments of this invention and in its broadest form may be utilized in virtually any well known heat energy conversion system wherein the input heat energy to such heat energy conversion systems is in the form of, or such system is otherwise powered by or capable of converting steam or heated fluid into other useful forms. Therefore, any use or useful conversions of energy produced or derived from the electrolytic cells of this invention are herein contemplated and need not be elaborated upon.

ELECTROLYTE

When the electrolytic cell is filled with a liquid electrolyte, current will flow between the conductive members. The preferred formulation for this electrolyte is generally that of a conductive salt in solution with water. The preferred embodiment of water is that of either natural water ($H_2^1O$) or heavy water and more specifically that of deuterium ($H_2^2O$), natural water being referred. The purity of all of the electrolyte components is of utmost importance in the preferred embodiment. The water ($H_2^1O$) and the deuterium ($H_2^2O$) must have a minimum resistance of one megohm with a turbidity of less than 0.2 n.t.u. This turbidity is controlled by ultra membrane filtration. The preferred salt solution is lithium sulfate ($Li_2SO_4$) in a one (1) molar mixture with water and is of chemically pure quality. In general, although a lithium sulfate is preferred, other conductive salts chosen from the group containing alkali, alkaline and ammonium ions such as boron, aluminum, gallium, and thallium, as well as lithium, alkali metal, earth and ammonium may be utilized. The preferred pH or acidity of the electrolyte is 9.0.

CONDUCTIVE BEADS/PARTICLES

Palladium coated microspheres were originally preferred as disclosed in U.S. Pat. Nos. '675 and '688 and as taught in my U.S. Pat. Nos. 4,943,355 and 5,036,031. Moreover, palladium may be substituted by other transition metals, rare earths and also uranium and thorium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconium, vanadium, tantalum, uranium, hafnium and thorium. Authority for the inclusion of these elements within this group is found in a book entitled *Inorganic Hydrides*, by B. L. Shaw, published by Pergammon Press, 1967. However, palladium and its alloys are the best known and most widely studied metallic hydride and was utilized in the preferred embodiment of my previously referenced patents to form conductive hydrogen-absorbing microspheres. The addition of nickel layering was also disclosed in U.S. Pat. No. 5,494,559.

A broad array of inert core materials including glass, ceramic, steel and silver may also be utilized to form cores for the catalytic beads. The important general material feature which appears to be in common with these cores proven to be successful is the inertness of the material or its lack of interaction with the electrolyte within the cell to produce heat. That function of producing excess heat is left entirely to the metallic hydride forming layer or layers applied atop the inert spherical core.

In an even more general sense, the broad requirement here is to provide a metallic hydride or deuteride forming particle in the presence of hydrogen, the exact shape and consistency in size being a secondary consideration so long as one of the conductive metals hereinabove described is used as a catalyst.

A broad array of solid materials including nickel, palladium and titanium may also serve as conductive beads. The important general material feature which appears to be in common with these is the use of metal particles without a coating or layered surface as a catalyst within the electrolytic cell which readily combine with hydrogen or an isotope of hydrogen to form a metallic hydride or deuteride with the electrolyte within the cell to produce heat.

NICKEL PARTICLES

The nickel particles have been used successfully in forming the catalytic bed within an electrolytic cell of a flow-through design to produce excess heat, the nickel particles being spherical and having a 1.0 mm diameter. These nickel particles were manufactured by Salem Specialty Ball Company, grade 200, lot number N46-04, having no special additional coating or other treatment whatsoever and were used as supplied by the manufacturer. Approximately 3.0 cc of particles were used to form the catalytic particle bed within each electrolytic cell tested.

PALLADIUM PARTICLES

An electrolytic cell in a flow-through design using a catalytic particle bed formed of palladium particles which were spherical and having a mixed diameter of from 1 mm to 8 mm has also produced excess heat. These palladium particles were supplied by Aldrich Chemical Co. having a purity of 99.97%, lot number 08912NH and, again, no special additional coating or other treatment was applied to these palladium particles and the electrolytic cell bed was formed of approximately 3 cc of these particles.

TITANIUM PARTICLES

Another flow-through electrolytic cell as described in the '675 and '688 patents, wherein the active catalytic bed was formed of titanium particles which were granules having a mesh size of 15, has also produced excess heat. These titanium particles, having a flake-like appearance, were also supplied by the Aldrich Chemical Co. The purity of these titanium particles was 99.95% from lot number 01608HW.

CELL RESISTANCE

In preparing the electrolytic cells for testing, the cell resistance utilizing a Whetstone Bridge or ohm meter was utilized prior to the introduction of the electrolyte into the electrolytic cell. This cell resistance, when dry, should be infinitely high. Otherwise, a short between the anode screen and the cathode beads exists and the unit would have to be repacked. When testing with electrolyte present at 0.02 amps, the resistance should be in the range of 100 to 200 ohms per sq. cm of cross section area as measured transverse to the direction of current flow.

RELATIVE SURFACE AREAS

The range in diameters of the conductive particles as above described is relatively broad, limited primarily by the ability to plate the cores and the economic factors involved therein. As a guideline however, it has been determined that there exists a preferred range in the ratio between the total surface area of all of the conductive particles collectively within the electrolytic cell and the inner surface area of the non-conductive housing which surrounds the bed of conductive particles A minimum preferred ratio of the total bead surface area to the inner housing surface area is in the range of 5 to 1

(5:1). However, an ideal area ratio is 10 to 1 (10:1) and is typically utilized in the experiments reported herebelow. This ratio is thus affected primarily by the size of the conductive particles, the smaller the diameter, the higher the ratio becomes.

This ratio is thus affected primarily by the size of the conductive particles, the smaller the diameter, the higher the ratio becomes. Preferably, the ratio of total bead surface area to the inner housing surface area is at least 5 to 1 (5:1). Improved efficiency was seen with a ratio of 10 to 1 (10:1), as was typically used in the experiments reported below.

EXPERIMENTAL RESULTS

The testing procedures incorporated two stages. The first stage may be viewed as a loading stage during which a relatively low level current (0.05 amps) is introduced across the conductive members, that current facilitated by the presence of the electrolyte as previously described.

LOADING

Figure 6:
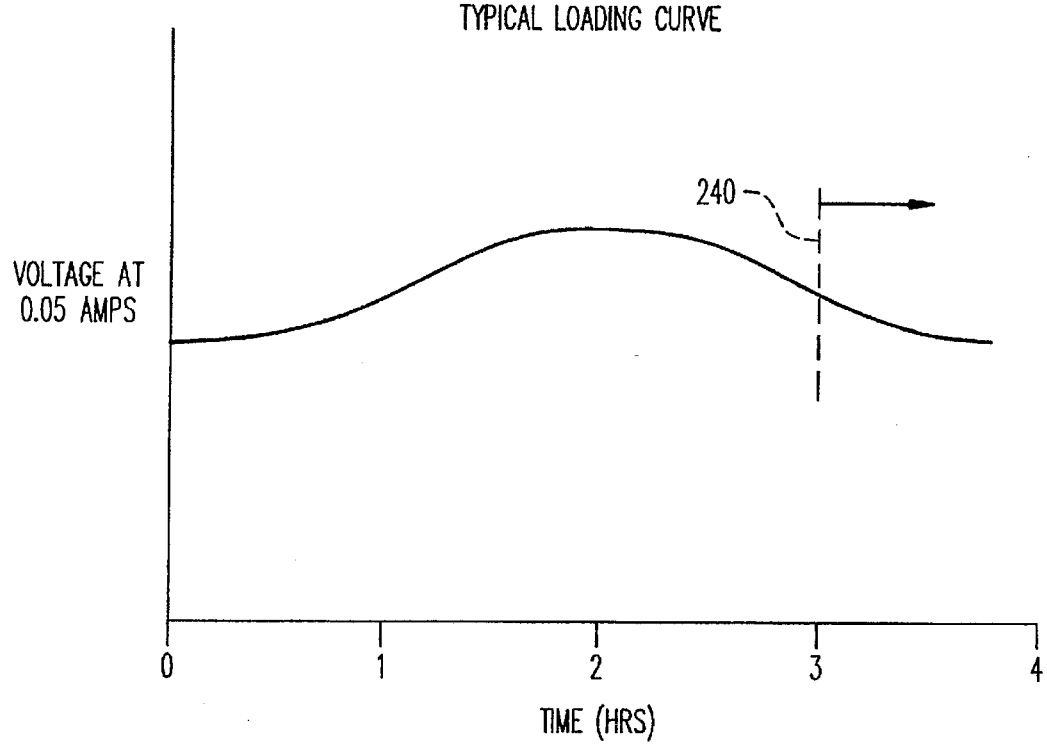
FIG. 6 is a graph generally showing a typical cell charging or loading curve.

During the initial loading, electrolysis of the water within the liquid electrolyte occurs so that the hydrogen active surface of the conductive particles fully absorbs and combines with hydrogen, i.e. becomes "loaded". This loading takes about two hours under a current flow through the cell of about 0.05 amps per two (2) $cm^3$ of particle volume. As the particles load with hydrogen, the resistance of the cell will be seen to increase. The celt's resistance measured at constant temperature should be seen to raise about 10%. It is recommended that the loading should proceed at least until the resistance is no longer increasing. As loading proceeds further, a decrease in resistance will appear. FIG. 6 is a general depiction of a typical cell loading curve Preferably the cell should be run after the loading has proceeded to at least the region beginning at 240.

TEST RUN

After hydrogen and/or hydrogen isotope, loading of the hydrogen active material of the conductive particles, the current level between conductive members is then incrementally increased, during which time the electrolyte temperature differential is monitored. The temperature of the electrolyte circulating within the electrolytic cell 12 was fully monitored, along with temperature differential and flow rate of the heat exchange liquid.

In general, all tabular results herebelow represent data taken on a steady state basis, input and output temperature of the liquid coolant being taken at 58 and 56, respectively, voltage (v) and current flow (a) across the electrolytic cell 12 measured between terminals or conductors 34 and 36. The flow rate of the coolant (ml/min) and calculated wattage input and wattage output and percent yield are also shown. Percent yield is defined and calculated as the wattage output divided by the wattage input times 100 percent. With respect to input voltage, no reduction was made for loss in electrolyzing $H_2O$ within the liquid electrolyte.

Table I herebelow represents a tabularization of actual performance testing conducted on the electrolytic cell of FIG. 1 hereinabove described.

TABLE I

| (N-P-N SPHERICAL PARTICLES AS CATALYST) | | | | | | | | |
|---|---|---|---|---|---|---|---|---|
| Volts (V) | Amps (A) | Watts In | T(out)°C. | T(in)°C. | ΔT°C. (To–Tin) | Flow ml/min | Watts Out | % Yield |
| 0 | 0 | 0 | 24.3 | 24.3 | 0 | 14.3 | 0 | 0 |
| 2.0 | 0.4 | 0.8 | 26.7 | 24.3 | 2.4 | 14.3 | 2.4 | 300. |
| 3.0 | 0.7 | 2.1 | 30.2 | 24.4 | 5.8 | 14.3 | 5.8 | 276. |
| 4.0 | 0.9 | 3.6 | 32.8 | 24.2 | 8.6 | 14.3 | 8.6 | 239. |
| 5.0 | 1.3 | 6.5 | 38.6 | 24.3 | 14.3 | 14.3 | 14.3 | 220. |
| 6.0 | 1.6 | 9.6 | 40.6 | 24.3 | 16.3 | 14.3 | 16.3 | 170. |

Table II herebelow represents the tabularization of actual test results performed with respect to the system 70 and electrolytic cell 72 of FIG. 2. Composition of the catalytic particles 78 within the particle bed 76 was the same as with respect to the catalytic beads described in FIG. 1 hereinabove.

TABLE II

| (N-P-N SPHERICAL PARTICLES AS CATALYST) | | | | | | | | |
|---|---|---|---|---|---|---|---|---|
| Volts (V) | Amps (A) | Watts In | T(out)°C. | T(in)°C. | ΔT°C. (To–Tin) | Flow ml/min | Watts Out | % Yield |
| 0 | 0 | 0 | 22.6 | 22.6 | 0 | 14.3 | 0 | 0 |
| 3.0 | 0.01 | 0.03 | 22.8 | 22.5 | 0.3 | 14.3 | 0.3 | 1000. |
| 3.2 | 0.02 | 0.06 | 23.1 | 22.4 | 0.7 | 14.3 | 0.7 | 1167. |
| 4.5 | 0.03 | 0.14 | 23.3 | 22.2 | 1.1 | 14.3 | 1.1 | 786. |
| 4.7 | 0.04 | 0.19 | 23.6 | 22.4 | 1.2 | 14.3 | 1.2 | 632. |
| 6.1 | 0.05 | 0.30 | 23.7 | 22.3 | 1.4 | 14.3 | 1.4 | 467. |

Table III herebelow represents a tabularization of actual test results performed with respect to the system 160 of FIG. 4.

This tabular data is displayed in two sections representing separate portions of the experimental test results. The first portion represents a calibration run wherein current input was applied only to the electrolyte heating resistor 198. No current was applied during this calibration run across the bed 184 of conductive particles 186. Temperature readings were taken of the coolant at 178 and 180 and of the electrolyte temperature at thermocouple 206. The ΔT value represents the differential in temperature between the liquid electrolyte 194 and the coolant 168.

The test run data is for these same values during application of electrical current across the conductive plates 188 and 196 by application of voltage between 202 and 204. During this test run, no current was applied at 207 across the heating resistor 198.

Figure 7:
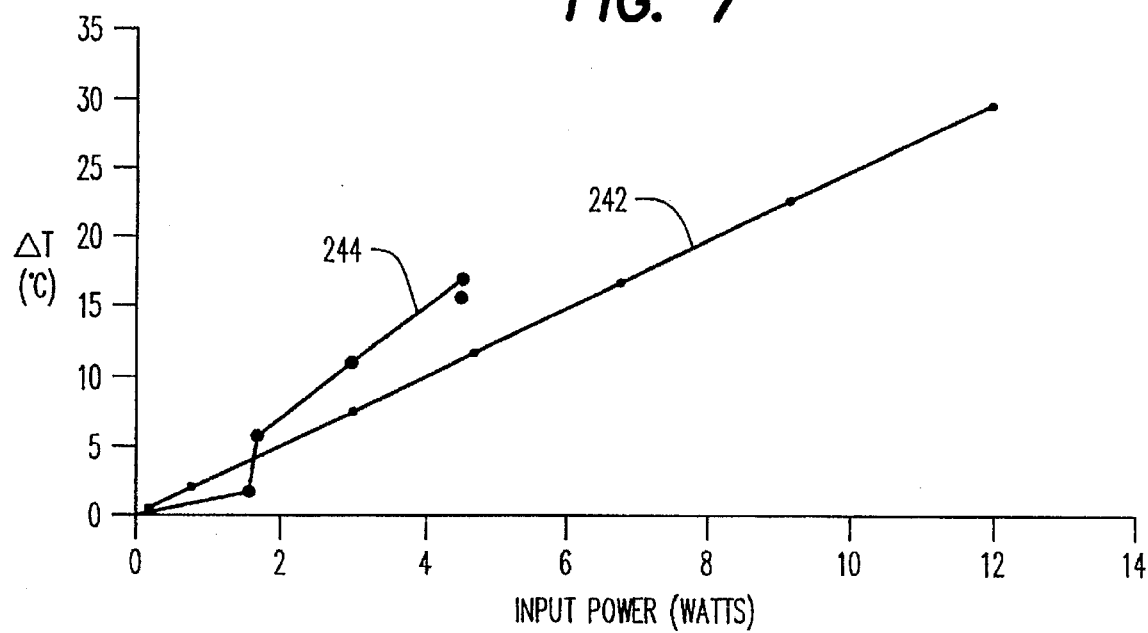
FIG. 7 is a graphic presentation of the data of Table III.

The breadth of representation of the tabular results in Table III is presented in FIG. 7. The heating effect (ΔT) with respect to input power in watts across the heating resistor 198 is displayed at 242 while the effect of heating the electrolyte (ΔT) by application of current across the bed 184 of conductive particles 186 is shown at 244. Note importantly that at and above a power input of 1.7 watts, the heating effect becomes significantly greater when current is applied across the bed 184 than with respect to current applied across the electrolyte heating resistor 198, thus clearly representing substantially increased heat output efficiency from the bed of conductive cells.

TABLE III

| Volts (V) | Amps (A) | Watts (IN) | T°C. (178) | T°C. (180) | T°C. (206) | ΔT T(206–178) |
|---|---|---|---|---|---|---|
| Calibration Run | | | | | | |
| Current Input to Resistor (198, FIG. 4) | | | | | | |
| 0.5 | 0.37 | 0.19 | 25.2 | 25.2 | 25.7 | 0.5 |
| 1.0 | 0.76 | 0.76 | 25.2 | 25.3 | 27.1 | 1.9 |
| 1.5 | 1.13 | 1.70 | 25.2 | 25.2 | 29.5 | 4.3 |
| 2.0 | 1.51 | 3.02 | 25.3 | 25.3 | 32.8 | 7.5 |
| 3.0 | 2.26 | 6.78 | 25.2 | 25.3 | 42.1 | 16.9 |
| 4.0 | 3.01 | 12.00 | 25.1 | 25.2 | 55.3 | 30.2 |
| 3.5 | 2.62 | 9.17 | 25.2 | 25.3 | 48.3 | 23.1 |
| 2.5 | 1.87 | 4.67 | 25.2 | 25.3 | 37.0 | 11.8 |
| Test Run | | | | | | |
| Current Input to Cell Between 188 and 196 | | | | | | |
| 3.8 | 0.11 | 0.42 | 25.4 | 25.4 | 26.6 | 1.2 |
| 4.8 | 0.33 | 1.58 | 25.5 | 25.4 | 29.1 | 3.6 |
| 4.6 | 0.37 | 1.70 | 25.4 | 25.5 | 30.9 | 5.5 |
| 6.0 | 0.50 | 3.00 | 25.3 | 25.4 | 36.3 | 11.0 |
| 6.1 | 0.75 | 4.58 | 25.5 | 25.4 | 42.3 | 16.8 |
| 5.0 | 0.90 | 4.50 | 25.3 | 25.4 | 40.8 | 15.5 |

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An electrolytic cell for producing excess heat which is transferred within said cell into a liquid electrolyte for use external of said cell, comprising:

a substantially non-conductive housing defining a substantially closed interior volume;

a bed of closely packed conductive particles within said housing, each of said conductive particles including a conductive metal which will combine with hydrogen or an isotope of hydrogen to form a metallic hydride or deuteride;

a first conductive member in electrical communication with said conductive particles;

a second conductive member electrically spaced from said conductive particles, said conductive particles being positioned generally between said first and second conductive members;

means operably connected to said first and second conductive members for applying a selected electrical current flow between said first and second conductive members when said bed and said first and second conductive members are immersed in said liquid electrolyte.

2. An electrolytic cell as set forth in claim 1, wherein:

said conductive metal is taken from the group consisting of palladium, lanthanum, praseodymium, cerium, titanium, zirconium, vanadium, tantalum, uranium, hafnium, nickel and thorium.

3. An electrolytic cell as set forth in claim 1, wherein:

said first conductive member is a slender conductive rod extending centrally through said bed;

said second conductive member is generally cylindrical and surrounds and is generally coextensive with said bed, said second conductive member and said bed being electrically spaced from one another by a generally cylindrical non-conductive screen.

4. An electrolytic cell as set forth in claim 3, further comprising:

condensing tube means extending upwardly from said housing for converting gases which escape from a liquid electrolyte in said housing back into a liquid and returning said liquid into said housing;

heat exchange means surrounding said condensing tube for removing heat from said gases as said gases are converted back into a liquid.

5. An electrolytic cell as set forth in claim 3, further comprising:

heat exchange means extending longitudinally into and generally coextensive with, said first conductive member for removing heat produced within said housing during operation of said cell.

6. An electrolytic cell as set forth in claim 1, wherein:

said first conductive member is a first perforated grid supported above a bottom of said housing and defines a lower surface of said bed;

said second conductive member is a second perforated grid spaced above an upper surface of said bed;

said bed inwardly spaced from a side of said housing to define an electrolyte gap therebetween;

an electrolyte reservoir including:

a first sponge layer positioned above said second grid;

a metallic screen mesh positioned above said first sponge layer;

a second sponge layer positioned above said metallic screen mesh.

7. An electrolytic cell as set forth in claim 1, further comprising:

heat exchange means surrounding said housing for removing heat from said housing;

an inner container within said housing, said inner container having an open upper end thereof and supporting said bed and said first and second conductive members therein;

means for heating said liquid electrolyte.

8. An electrolytic cell for producing excess heat in a liquid electrolyte comprising:

a substantially non-conductive housing defining a substantially closed interior volume;

a bed of closely packed conductive particles within said housing, each of said conductive particles including a conductive metal which will combine with hydrogen or an isotope of hydrogen to form a metallic hydride or deuteride;

a first conductive member in electrical communication with said conductive particles;

a second conductive member electrically spaced from said conductive particles, said conductive particles being positioned generally between said first and second conductive members;

means operably connected to said first and second conductive members for applying a selected electrical current flow between said first and second conductive members when said bed is immersed in said liquid electrolyte;

heat exchange means for removing excess heat from said housing for use separate from said cell.

9. An electrolytic cell as set forth in claim 8, wherein:

said conductive metal is taken from the group consisting of palladium, lanthanum, praseodymium, cerium, titanium, zirconium, vanadium, tantalum, uranium, hafnium, nickel and thorium.

10. A system for producing excess heat which is transferred into a liquid electrolyte for use external to said system, comprising:

an electrolytic cell including:

a substantially non-conductive housing defining a substantially closed interior volume;

a bed of closely packed conductive particles within said housing, each of said conductive particles including a conductive metal which will combine with hydrogen or an isotope of hydrogen to form a metallic hydride or deuteride;

a first conductive member in electrical communication with said conductive particles;

a second conductive member electrically spaced from said conductive particles, said conductive particles being positioned generally between said first and second conductive members;

means operably connected to said first and second conductive members for applying a selected electrical current flow between said first and second conductive members when said housing is substantially filed with said liquid electrolyte, said liquid electrolyte having a conductive salt in solution with water;

heat exchange means for removing excess heat from said liquid electrolyte for use separate from said system.

11. A system as set forth in claim 10, wherein:

said conductive metal is taken from the group consisting of palladium, lanthanum, praseodymium, cerium, titanium, zirconium, vanadium, tantalum, uranium, hafnium, nickel and thorium.

12. A system as set forth in claim 10, wherein:

said first conductive member is a slender conductive rod extending centrally through said bed;

said second conductive member is generally cylindrical and surrounds and is generally coextensive with said bed, said second conductive member and said bed being electrically spaced from one another by a generally cylindrical non-conductive screen.

13. A system as set forth in claim 12, further comprising:

condensing tube means extending upwardly from said housing for converting gases which escape from a liquid electrolyte in said housing back into a liquid and returned into said housing;

heat exchange means surrounding said condensing tube for removing heat from said gases as said gases are converted back into a liquid.

14. A system as set forth in claim 12, further comprising:

heat exchange means extending longitudinally into and generally coextensive with, said first conductive member for removing heat produced within said housing during operation of said cell.

15. A system as set forth in claim 10, wherein:

said first conductive member is a first perforated grid supported above a bottom of said housing and defines a lower surface of said bed;

said second conductive member is a second perforated grid spaced above an upper surface of said bed;

said bed inwardly spaced from a side of said housing to define an electrolyte gap therebetween;

an electrolyte reservoir including:

a first sponge layer positioned above said second grid;

a metallic screen mesh positioned above said first sponge layer;

a second sponge layer positioned above said metallic screen mesh.

16. A system as set forth in claim 10, further comprising:

heat exchange means surrounding said housing for removing heat from said housing;

an inner container within said housing, said inner container having an open upper end thereof and supporting said bed and said first and second conductive members therein;

means for heating a liquid electrolyte when within said inner container.

17. A system as set forth in claim 10, further comprising:

a plurality of non-metallic beads each having ion exchange properties;

said plurality of non-metallic beads positioned between said second conductive member and said bed;

said plurality of non-metallic beads forming a conductive salt bridge thereacross.

* * * * *